(12) United States Patent
Tomaru et al.

(10) Patent No.: US 8,658,282 B2
(45) Date of Patent: Feb. 25, 2014

(54) OPTICAL FILM AND MANUFACTURING METHOD THEREFOR

(75) Inventors: Mikio Tomaru, Minami-Ashigara (JP); Takao Taguchi, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 13/175,506

(22) Filed: Jul. 1, 2011

(65) Prior Publication Data
US 2012/0004360 A1 Jan. 5, 2012

(30) Foreign Application Priority Data

Jul. 5, 2010 (JP) ................................ 2010-153202

(51) Int. Cl.
*B32B 27/08* (2006.01)
*B32B 33/00* (2006.01)
*G02B 5/30* (2006.01)

(52) U.S. Cl.
USPC .................... 428/411.1; 428/910; 359/483.01

(58) Field of Classification Search
None
See application file for complete search history.

(56) References Cited

U.S. PATENT DOCUMENTS

2008/0138541 A1 6/2008 Moto et al.

FOREIGN PATENT DOCUMENTS

| JP | 2004-101883 A | 4/2004 |
| JP | 2007-101566 A | 4/2007 |
| JP | 4011911 B2 | 11/2007 |
| JP | 2008-310343 A | 12/2008 |

OTHER PUBLICATIONS

Machine translation of JP 2003-195051 A, i.e. JP 4011911 B2, Jul. 2003.*

* cited by examiner

*Primary Examiner* — Ramsey Zacharia
(74) *Attorney, Agent, or Firm* — Birch, Stewart, Kolasch & Birch, LLP (57) ABSTRACT

An optical film which has a hard coat layer provided on one side of a film substrate, comprising:
a curl value smaller than 0, which has been measured after the film substrate of a manufactured optical film has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward;
and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour.

4 Claims, 2 Drawing Sheets

| Vapor treatment time [sec] | Tension in vapor-treated part [N/m] | Curl in width direction [1/m] | Curl in longitudinal direction [1/m] | \| Curl in width direction + curl in longitudinal direction \| [1/m] | Involvement of bubble in lamination | Position gap in lamination |
|---|---|---|---|---|---|---|
| No treatment | No treatment | 24 | 33 | — | D | D |
| 0.5 | 150 | 13 | 26 | — | D | D |
| 1 | 150 | 0 | 3 | — | C | C |
| 5 | 150 | -2 | -2 | 4 | B | B |
| 10 | 150 | -4 | -4 | 8 | B | B |
| 0.5 | 200 | 8 | 29 | — | C | C |
| 1 | 200 | -2 | 6 | 4 | A | A |
| 5 | 200 | -4 | 1 | 3 | A | A |
| 10 | 200 | -5 | -3 | 8 | B | B |
| 0.5 | 300 | 5 | 32 | — | C | C |
| 1 | 300 | -4 | 8 | 4 | A | A |
| 5 | 300 | -6 | 4 | 2 | A | A |
| 10 | 300 | -7 | -1 | 8 | B | B |
| 0.5 | 400 | 4 | 35 | — | C | C |
| 1 | 400 | -5 | 11 | 6 | A | B |
| 5 | 400 | -8 | 7 | 1 | A | A |
| 10 | 400 | -9 | 4 | 5 | A | A |
| 0.5 | 500 | 3 | 36 | — | C | C |
| 1 | 500 | -6 | 12 | 6 | A | B |
| 5 | 500 | -9 | 9 | 0 | A | A |
| 10 | 500 | -10 | 6 | 4 | A | A |

OPTICAL FILM AND MANUFACTURING METHOD THEREFOR

BACKGROUND OF THE INVENTION

1. Field of the Invention

The present invention relates to an optical film and a manufacturing method therefor, and particularly relates to the optical film provided with a hard coat, which is used as a protective layer of a polarizing plate of a liquid crystal television or monitor, and the manufacturing method therefor.

2. Description of the Related Art

The optical film provided with the hard coat is occasionally used as a protective layer of a polarizing plate and the like of a liquid crystal monitor or television, which is one of applications. In this case, when the polarizing plate is manufactured, the optical film is subjected to saponification treatment for securing adhesiveness to an adhesive, and then is laminated with the polarizer by the adhesive.

The optical film provided with the hard coat to be thus used as the protective layer of the polarizing plate of a liquid crystal television or monitor generates such a curl that the liquid-applied face side becomes inside, due to the curing and shrinking of the hard coat layer by irradiation with an active beam, which has been a cause of the decrease of the product yield due to meandering during transportation, a displacement of a laminated position and the involvement of bubbles occurring when the polarizing plate is formed.

Then, Japanese Patent Application Laid-Open No. 2004-101883 and Japanese Patent Application Laid-Open No. 2008-310343 provide a method of reducing the curl by providing a back coat layer in the opposite side of the surface having the hard coat applied thereon, as the preventive measures.

Japanese Patent No. 4011911 also discloses a method of reducing the curl by exposing the outside surface of the curl to vapor.

However, there has been a problem that the optical film adjusted to the state of having no curl by using the methods of the above three documents results in causing the curl so that the surface side having the hard coat layer applied thereon becomes inside, when a tension has been applied to the optical film in the longitudinal direction during the transportation when the optical film is laminated with the polarizer. This problem has become much more remarkable due to the tendency of the width increase and thinning of the optical film, and has been a cause of poor transportation precision and the involvement of bubbles.

SUMMARY OF THE INVENTION

The present invention is designed with respect to such circumstances, and the objects are to provide an optical film superior in transportability and lamination suitability in a lamination step in a polarizing plate processing, and to provide a manufacturing method therefor.

In order to achieve the objects, the present invention provides an optical film that has a hard coat layer provided on one side of a film substrate, and comprises: a curl value smaller than 0, which has been measured after the film substrate of the manufactured optical film has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward; and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour.

In other words, the present invention provides such an optical film that the curl in the width direction becomes convex toward the surface side having the hard coat layer applied thereon, and that the curl in the longitudinal direction becomes concave toward the surface side having the hard coat layer applied thereon.

By making the curl in the width direction become convex toward the surface side having the hard coat layer applied thereon, the optical film can maintain an approximately flat state in such a state that a tension has been applied during the transportation in a lamination step, and does not meander during the transportation in a lamination step with the polarizing plate to enhance the accuracy of the position of the lamination and also decrease the involvement of bubbles in the lamination step.

In addition, by reversing the direction of the curl in the longitudinal direction with respect to that of the curl in the width direction, an apparent flexural rigidity increases, tight warps, wrinkles and the like resist being produced, transportation precision in the lamination step is enhanced, and an effect of reducing the involvement of bubbles is remarkably improved.

For information, in the present invention, a curl value of the optical film can be measured according to a measuring method (ANSI/ASC PH 1.29-1985, Method-A) which is specified by American National Standards Institute. Specifically, a curl value in the width direction of the optical film is defined as a curl value read out after the optical film has been cut out into a size of 35 mm in the width direction and 2 mm in the longitudinal direction, then placed on a curl plate, and moisture-conditioned under an environment with a temperature of 25° C. and a relative humidity of 65% for 1 hour.

In addition, a curl value in the longitudinal direction of the optical film is defined as a curl value read out after the optical film has been cut out into a size of 2 mm in the width direction and 35 mm in the longitudinal direction, then placed on a curl plate, and moisture-conditioned under an environment with a temperature of 25° C. and a relative humidity of 65% for 1 hour.

Furthermore, in the present invention, an absolute value of the sum of the curls of the optical films is preferably 5 (1/m) or less, one of which has been cut out into a size of 35 mm in the width direction and 2 mm in the longitudinal direction and the other of which has been cut out into a size of 2 mm in the width direction and 35 mm in the longitudinal direction.

When the absolute value of the sum of the curl value in the width direction and the curl value in the longitudinal direction is 5 (1/m) or less, the accuracy of the position in the width direction of the lamination can be further enhanced.

Incidentally, here, the curl value is expressed by an inverse number of a curvature radius (m).

In order to achieve the objects, the present invention provides a method for manufacturing an optical film that shows a curl value smaller than 0, which has been measured after a film substrate having a hard coat layer provided on one side has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward, and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour, comprising: exposing a surface on the opposite side of the hard coat layer to water vapor or solvent vapor after the hard coat layer has been cured, and adjusting a transportation tension when the hard coat layer is cured and/or when the hard coat layer is exposed to water vapor or solvent vapor.

An optical film superior in transportability and lamination suitability in a lamination step in a polarizing plate processing according to the present invention can be manufactured by exposing a surface on the opposite side of the hard coat layer to water vapor or solvent vapor after the hard coat layer has been cured, and adjusting the transportation tension when the hard coat layer is cured and/or when the hard coat layer is exposed to water vapor or solvent vapor.

Furthermore, in order to achieve the objects, the present invention provides a method for manufacturing an optical film that shows a curl value smaller than 0, which has been measured after a film substrate having a hard coat layer provided on one side has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward, and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour, comprising: applying a solvent or a back coat layer onto a surface on the opposite side of the surface having the hard coat layer provided thereon, and adjusting a transportation tension when the solvent or the back coat layer is dried.

An optical film superior in transportability and lamination suitability in a lamination step in a polarizing plate processing according to the present invention can be manufactured by applying the solvent or the back coat layer onto the surface on the opposite side of the surface having the hard coat layer provided thereon, and adjusting the transportation tension when the solvent or the back coat layer is dried.

The optical film according to the present invention is preferably used as a protective layer of a polarizing plate.

This is because the optical film according to the present invention is superior in the transportability and the lamination suitability in the lamination step in the polarizing plate processing.

The present invention can provide an optical film superior in transportability and lamination suitability in a lamination step in a polarizing plate processing, and a manufacturing method therefor.

DETAILED DESCRIPTION OF THE PREFERRED EMBODIMENTS

An embodiment according to the present invention will be described in detail below. However, the present invention is not limited to the embodiment described here.

The optical film according to the present invention has a hard coat layer provided on one side of a film substrate, and shows: a curl value smaller than 0, which has been measured after the film substrate of the manufactured optical film has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward; and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour. In other words, the present invention provides such an optical film that the curl in the width direction becomes convex toward the surface side having the hard coat layer applied thereon, and that the curl in the longitudinal direction becomes concave toward the surface side having the hard coat layer applied thereon.

By making the curl in the width direction become convex toward the surface side having the hard coat layer applied thereon, the optical film can maintain an approximately flat state in such a condition that a tension has been applied during the transportation in a lamination step, does not meander during the transportation in the lamination step with the polarizing plate to enhance the accuracy of the position of the lamination and besides, decreases the involvement of bubbles in the lamination step. The above described lamination with the polarizing plate will be described later.

In addition, by reversing the direction of the curl in the longitudinal direction with respect to that of the curl in the width direction, an apparent flexural rigidity increases, tight warps, wrinkles and the like resist being produced, transportation precision in the lamination step is enhanced, and an effect of reducing the involvement of bubbles is remarkably improved.

In the present invention, the curl value of the optical film can be measured according to a measuring method (ANSI/ASC PH 1.29-1985, Method-A) which is specified by American National Standards Institute. Specifically, the curl value in the width direction of the optical film is defined as a curl value read out after the optical film has been cut out into a size of 35 mm in the width direction and 2 mm in the longitudinal direction, then placed on a curl plate, and moisture-conditioned under an environment with a temperature of 25° C. and a relative humidity of 65% for 1 hour.

In addition, in the present invention, the curl value in the longitudinal direction of the optical film is defined as a curl value read out after the optical film has been cut out into a size of 2 mm in the width direction and 35 mm in the longitudinal direction, then placed on a curl plate, and moisture-conditioned under an environment with a temperature of 25° C. and a relative humidity of 65% for 1 hour.

Furthermore, in the present invention, an absolute value of the sum of the above described curls of the optical films is preferably 5 (1/m) or less, one of which has been cut out into a size of 35 mm in the width direction and 2 mm in the longitudinal direction and the other of which has been cut out into a size of 2 mm in the width direction and 35 mm in the longitudinal direction.

When the absolute value of the sum of the curl value in the width direction and the curl value in the longitudinal direction is 5 (1/m) or less, the accuracy of the position in the width direction of the lamination can be further enhanced.

Incidentally, here, the curl value is expressed by an inverse number of a curvature radius (m).

In order to obtain the above described optical film, it is considered to manufacture the optical film by exposing a surface on the opposite side of the hard coat layer to water vapor or solvent vapor after the hard coat layer has been cured, and adjusting a transportation tension when the hard coat layer is cured and/or when the hard coat layer is exposed to water vapor or solvent vapor.

When the water vapor is used, the temperature of the water vapor is preferably in the range of 100 to 150° C.

The solvent vapor is preferably a vapor which has been vaporized from methylene chloride, methyl acetate, acetone or a mixture thereof. One example of the preferable solvent vapor can include a vapor of which the main component is methylene chloride and methyl acetate. In this case, the vapor further preferably includes methylene chloride and methyl acetate in the range of 100 to 50 mass % in total with respect to the whole vapor, and further includes acetone in the range of 0 to 50 mass %.

In order to obtain the above described optical film, it is also considered to manufacture the optical film by applying a solvent or a back coat layer onto a surface on the opposite side of the surface having the hard coat layer provided thereon, and adjusting a transportation tension when the solvent or the back coat layer is dried.

Specifically, the manufacturing method is a method of imparting such properties that the surface having the solvent or the back coat layer provided thereon curls to come inward to the optical film, and thereby making the degree of the curl balanced.

Incidentally, the back coat layer is applied preferably to serve as a blocking layer as well, and in this case, the application composition can contain inorganic fine particles and/or organic fine particles (filler or filler particles) for imparting a blocking prevention function to the back coat layer.

An anti-curl function is imparted specifically by applying a composition containing a solvent which dissolves or swells a resin film support to be used as a protective film for the polarizing plate. The solvent to be used may further include a solvent which does not dissolve the support, in addition to the mixture of the dissolving solvent or the swelling solvent, and the anti-curl function is imparted by employing a composition in which the above solvents are mixed at an appropriate rate and by employing an amount to be applied, according to a degree of the curl of the resin film or the type of the resin.

When it is intended to strengthen a curl prevention function, it is effective to increase a mixing ratio of the dissolving solvent or the swelling solvent and decrease a ratio of the undissolving solvent, in the solvent composition to be used. The mixing ratio in the solvent composition to be used preferably satisfies (dissolving solvent or swelling solvent):(undissolving solvent)=10:0 to 1:9.

The solvent which dissolves or swells the resin film support contained in such a mixed composition includes, for instance, benzene, toluene, xylene, dioxane, acetone, methyl ethyl ketone, N,N-dimethylformamide, methyl acetate, ethyl acetate, trichloroethylene, methylene chloride, ethylene chloride, tetrachloroethane, trichloroethane and chloroform. The solvent which does not dissolve the support includes, for instance, methanol, ethanol, n-propyl alcohol, i-propyl alcohol and n-butanol.

These application compositions are applied onto the surface of the support with the use of an applicator so as to form a wet film with a thickness preferably of 1 to 100 μm and particularly preferably of 5 to 50 μm. A resin may be dissolved in the above described solvent.

The material of a filler particle may be an inorganic filler particle, an organic filler particle, or an organic and inorganic composite filler particle.

An example of the inorganic filler particle includes, for instance, a white inorganic pigment such as precipitated calcium carbonate light, calcium carbonate heavy, magnesium carbonate, kaolin, clay, talc, calcium sulfate, barium sulfate, titanium dioxide, zinc oxide, zinc hydroxide, zinc sulfide, zinc carbonate, hydrotalcite, aluminum silicate, diatomite, calcium silicate, magnesium silicate, synthetic amorphous silica, colloidal silica, alumina, colloidal alumina, pseudoboehmite, aluminum hydroxide, lithopone, zeolite and magnesium hydroxide.

Examples of the organic filler particle include so-called a plastic pigment and a wax particle. The material of the organic filler particle includes polyvinyl chloride, polyvinylidene chloride, polyacrylate, polymethacrylate, an elastomer, an ethylene-vinyl acetate copolymer, a styrene-(meth)acrylic copolymer, a polyester, polyvinyl ether, polyvinyl acetal, a polyamide, a polyurethane, a polyolefin, SBR, NBR, polytetrafluoroethylene, chloroprene, protein, polysaccharide, rosin ester and a shellac resin, which are conventionally known materials in which the glass transition temperature is higher than room temperature. The material may also include a resin to which a specific modification group has been added or a resin from which a specific leaving group has been removed. Furthermore, the usable material of the organic filler particle is not limited to the resin, but also includes so-called a wax material including a metal stearate. The organic filler particle may be formed by mixing two or more types of the materials, and furthermore, two or more types of organic filler fine particles may be mixed and used.

Figure 1A:
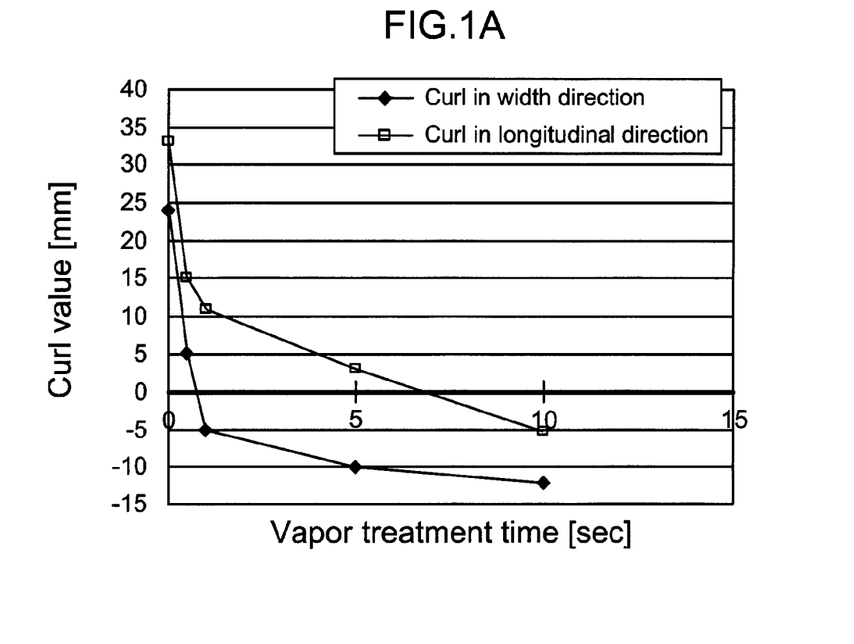
FIGS. 1A and 1B are views showing a graph which shows measured curl values of the optical film manufactured by the manufacturing method according to the present invention, respectively.
Figure 1B:
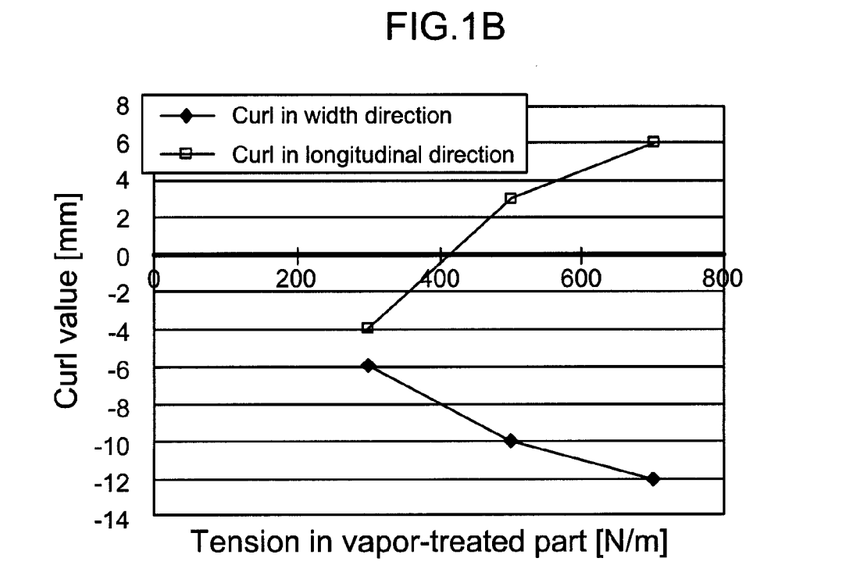

FIGS. 1A and 1B are graphs showing measured curl values of the optical film manufactured by a method for manufacturing the optical film according to the present invention, respectively. FIGS. 1A and 1B show the curl values of the optical films which have been manufactured by exposing a surface on the opposite side of the hard coat layer to vapor after the hard coat layer has been cured, and adjusting a transportation tension when the hard coat layer is exposed to vapor; 1A shows a result of having varied a period of time spent for exposing the surface to vapor in a state of having kept a transportation tension constant, and having examined a relationship between the period of time and the curl values in the width direction and in the longitudinal direction; and 1B shows a result of having varied the transportation tension in a state of having kept the period of time spent for exposing the surface to vapor constant, and having examined a relationship between the transportation tension and the curl values in the width direction and in the longitudinal direction. For information, the curl value is measured according to the above described measuring method (ANSI/ASC PH 1.29-1985, Method-A) which is specified by American National Standards Institute.

As is understood from FIG. 1A, the curl value in the width direction can be made smaller than 0 by prolonging the period of time spent for exposing the surface to the vapor, and the curl value in the longitudinal direction can be made larger than 0 by shortening the period of time spent for exposing the surface to the vapor. As is understood from FIG. 1B, by increasing the transportation tension, the curl value in the width direction can be decreased and the curl value in the longitudinal direction can be increased.

Accordingly, an optical film can be manufactured which shows a curl value in the width direction smaller than 0, specifically, of which the curl in the width direction becomes convex toward the surface side having the hard coat layer applied thereon, by exposing a surface on the opposite side of the hard coat layer to water vapor or solvent vapor after the hard coat layer has been cured, and adjusting the transportation tension when the hard coat layer is exposed to water vapor or solvent vapor.

Furthermore, an optical film can be manufactured which shows a curl value in the longitudinal direction larger than 0, specifically, of which the curl in the longitudinal direction becomes concave toward the surface side having the hard coat layer applied thereon.

By making the curl in the width direction become convex toward the surface side having the hard coat layer applied thereon, the optical film can maintain an approximately flat state in such a condition that a tension has been applied during the transportation in a lamination step, does not meander during the transportation in the lamination step with the polarizing plate to enhance the accuracy of the position of the lamination, and besides, can decrease the involvement of bubbles in the lamination step. In addition, by reversing the direction of the curl in the longitudinal direction with respect to that of the curl in the width direction, an apparent flexural rigidity increases, tight warps, wrinkles and the like resist being formed, transportation precision in the lamination step can be enhanced, and an effect of reducing the involvement of bubbles can be remarkably improved. Specifically, an optical film superior in transportability and lamination suitability in the lamination step in a polarizing plate processing can be manufactured by exposing the surface on the opposite side of the hard coat layer to water vapor or solvent vapor after the hard coat layer has been cured, and adjusting the transportation tension when the hard coat layer is exposed to water vapor or solvent vapor.

The optical film and the polarizing plate processing according to the present invention will be described in detail below.

[Support]

A plastic film is preferably used as a support onto which an application liquid is applied. A polymer which forms the plastic film includes a cellulose ester (for instance, triacetyl cellulose, diacetyl cellulose, and typically TAC-TD 80U, TD80UF and the like made by FUJIFILM Corporation), a polyamide, a polycarbonate, a polyester (for instance, polyethylene terephthalate and polyethylene naphthalate), polystyrene, a polyolefin, a norbornene-based resin (ARTON: trade name, made by JSR Corporation) and an amorphous polyolefin (ZEONEX: trade name, made by ZEON CORPORATION). Among the polymers, triacetyl cellulose, polyethylene terephthalate and polyethylene naphthalate are preferable, and triacetyl cellulose is particularly preferable. A cellulose acylate film which does not substantially contain halogenated hydrocarbon such as dichloromethane and a manufacturing method therefor are described in Journal of Technical Disclosure by the Japan Institute of Invention and Innovation (Technical Disclosure No. 2001-1745, published on Mar. 15, 2001, hereinafter abbreviated as Journal of Technical Disclosure No. 2001-1745), and the cellulose acylate described here can also be preferably used in the present invention.

[Hard Coat Layer]

A hard coat layer is formed for the purpose of imparting hard coating properties for enhancing the scratch resistance (especially indentation hardness) of a film to the transparent support, and is formed of an ionizing radiation curing type of a translucent resin, preferably of an ultraviolet (UV) curing type resin. At least one layer is, and two or more layers as needed are applied on the transparent support. The total layer thickness of the hard coat layer is preferably in the range of 1.5 to 40 μm. When the total layer thickness is less than 1 μm, necessary scratch resistance tends to be insufficient, which is not preferable. On the other hand, when the total layer thickness of the hard coat layer exceeds 40 μm, problems start occurring in brittleness or a film curl, which is not preferable.

(Binder)

The hard coat layer according to the present invention is formed by a cross-linking reaction and a polymerization reaction of an ionizing radiation curable compound. Specifically, the hard coat layer is formed by applying an application composition which contains an ionizing radiation curable polyfunctional monomer and polyfunctional oligomer as a binder onto the transparent support, and causing a cross-linking reaction or a polymerization-reaction in the polyfunctional monomer or the polyfunctional oligomer. A functional group of the ionizing radiation curable polyfunctional monomer or polyfunctional oligomer is preferably a functional group polymerizable by light (ultraviolet light), an electron beam or radioactive rays, and among the functional groups, the photopolymerizable functional group is preferable. The photopolymerizable functional group includes an unsaturated polymerizable functional group such as a (meth)acryloyl group, a vinyl group, a styryl group and an allyl group, and among the photopolymerizable functional groups, the (meth)acryloyl group is preferable.

Specific examples of the photopolymerizable polyfunctional monomer having the photopolymerizable functional group can include: (meth)acrylic diesters of an alkylene glycol, such as neopentyl glycol acrylate, 1,6-hexandiol(meth)acrylate and propylene glycol di(meth)acrylate; (meth)acrylic diesters of a polyoxyalkylene glycol, such as triethylene glycol di(meth)acrylate, dipropylene glycol di(meth)acrylate, polyethylene glycol di(meth)acrylate and polypropylene glycol di(meth)acrylate; (meth)acrylic diesters of a polyhydric alcohol, such as pentaerythritol di(meth)acrylate; and (meth)acrylic diesters of an ethylene oxide or a propylene oxide adduct such as 2,2-bis{4-(acryloxy-diethoxy)phenyl} propane and 2-2-bis{4-(acryloxy-polypropoxy)phenyl}propane.

The binder of the polyfunctional monomer can employ monomers having different refractive indices in order to control a refractive index of each layer. An example of a high refractive-index monomer in particular includes, bis(4-methacryloyl thiophenyl)sulfide, vinyl naphthalene, vinyl phenylsulfide and 4-methacryloxyphenyl-4'-methoxyphenyl thioether. In addition, the binder can employ a dendrimer described, for instance, in Japanese Patent Application Laid-Open No. 2005-76005 and Japanese Patent Application Laid-Open No. 2005-36105, and a norbornene-ring-containing monomer described, for instance, in Japanese Patent Application Laid-Open No. 2005-60425.

The binder of the polyfunctional monomer or the polyfunctional oligomer may be concomitantly used with two or more other binders. The polymerization of these binders having the ethylenic unsaturated group can be proceeded by irradiation with ionizing radiation or by heating, under the existence of a photo-radical initiator or a thermal radical initiator.

It is preferable to use a photopolymerization initiator for the polymerization reaction of a photopolymerizable polyfunctional monomer or polyfunctional oligomer. A preferable photopolymerization initiator is a radical photopolymerization initiator and a cationic photopolymerization initiator, and a particularly preferable photopolymerization initiator is the radical photopolymerization initiator.

In the present invention, a polymer or a cross-linked polymer can be concomitantly used as the binder. The cross-linked polymer preferably has an anionic group. The cross-linked polymer having the anionic group has a structure in which a main chain having the anionic group in the polymer is cross-linked.

An example of the main chain of the polymer includes, a polyolefin (saturated hydrocarbon), a polyether, a polyurea, a polyurethane, a polyester, a polyamine, a polyamide and a melamine resin. Preferable main chains are the polyolefin, the polyether and the polyurea, and further preferable main chains are the polyolefin and the polyether, and the most preferable main chain is the polyolefin.

The anionic group is directly combined with the main chain of the polymer, or is combined with the main chain through a linking group. The anionic group is preferably combined with the main chain in a form of a side chain through the linking group.

An example of the anionic group includes, a carboxylic group (carboxyl), a sulfonic group (sulfo) and a phosphate group (phosphono), and preferably includes the sulfonic group and the phosphate group. The anionic group may be in a state of a salt. A cation which forms the salt with the anionic group is preferably an ion of an alkali metal. In addition, a proton of an anionic group may be dissociated.

The linking group which combines the anionic group with the main chain of the polymer is preferably a bivalent group selected from —CO—, —O—, an alkylene group, an arylene group and the combinations of them.

A cross-linked structure is formed by chemically combining two or more main chains with each other (preferably through covalent bond), but is preferably formed by combining three or more main chains so as to form covalent bonds. The cross-linked structure is preferably formed of a bivalent or multivalent group selected from —CO—, —O—, —S—, a nitrogen atom, a phosphorus atom, an aliphatic residue, an aromatic residue and the combinations of them.

The cross-linked polymer having the anionic group is preferably a copolymer having a repeating unit having the anionic group and a repeating unit having the cross-linked structure. A ratio of the repeating unit having the anionic group in the copolymer is preferably 2 to 96 mass %, further preferably is 4 to 94 mass %, and most preferably is 6 to 92 mass %. The repeating unit may have two or more anionic groups. A ratio of the repeating unit having the cross-linked structure in the copolymer is preferably 4 to 98 mass %, further preferably is 6 to 96 mass %, and most preferably is 8 to 94 mass %.

The repeating unit of the cross-linked polymer having the anionic group may have both of the anionic group and the cross-linked structure. In addition, another repeating unit (repeating unit free from any of anionic group and cross-linked structure) may be contained.

Another repeating unit is preferably a repeating unit having an amino group or a quaternary ammonium group, and a repeating unit having a benzene ring. The amino group or the quaternary ammonium group has a function of maintaining the dispersed state of the inorganic particles, as an anionic group as well has. Incidentally, the amino group, the quaternary ammonium group and the benzene ring provide a similar effect, even when being contained in the repeating unit having the anionic group or in the repeating unit having the cross-linked structure.

In the repeating unit having the amino group or the quaternary ammonium group, the amino group or the quaternary ammonium group is directly combined with the main chain of the polymer, or is combined with the main chain through the linking group. The amino group or the quaternary ammonium group is preferably combined with the main chain in the form of a side chain through a linking group. The amino group or the quaternary ammonium group is preferably a secondary amino group, a tertiary amino group or a quaternary ammonium group, and further preferably is the tertiary amino group or the quaternary ammonium group. The group which is combined with a nitrogen atom of the secondary amino group, the tertiary amino group or the quaternary ammonium group is preferably an alkyl group, preferably is an alkyl group having 1 to 12 carbon atoms, and further preferably is an alkyl group having 1 to 6 carbon atoms. A counter ion of the quaternary ammonium group is preferably a halide ion. The linking group which combines the amino group or the quaternary ammonium group with the main chain of the polymer is preferably a bivalent group selected from —CO—, —NH—, —O—, an alkylene group, an arylene group and the combinations of them. When the cross-linked polymer having the anionic group includes a repeating unit having the amino group or the quaternary ammonium group, the ratio is preferably 0.06 to 32 mass %, further preferably is 0.08 to 30 mass %, and most preferably is 0.1 to 28 mass %.

(Translucent Fine Particles)

In the present invention, the hard coat layer may contain at least one type of cohesive metal-oxide particles as translucent fine particles. The cohesive metal-oxide particles are used for the purpose of [1] adjusting the refractive index, [2] increasing the hardness, [3] improving the brittleness and the curl, [4] imparting haze to the surface of the hard coat layer, and the like. Cohesive silica particles and cohesive alumina particles are preferable for imparting the haze to the surface in the point of being transparent and inexpensive, and among them, cohesive silica in which the primary particles with particle sizes of several tens of nanometers form an aggregate is preferable in the point of being capable of stably imparting a moderate haze to the surface. The cohesive silica can be obtained, for instance, by the synthesis through a neutralization reaction of sodium silicate with sulfuric acid, which is so-called a wet process, but the method is not limited to the synthesis. The wet process is divided roughly into a sedimentation method and a gelling method, but either of the methods may be used in the present invention. The secondary particle size of cohesive silica is preferably in the range of 0.1 to 10.0 μm, but is selected by the combination with the thickness of the hard coat layer containing the particles. The secondary particle size is adjusted by the dispersion degree of the particles (controlled by a mechanical dispersion method using a sand mill or the like, or by a chemical dispersion method using a dispersing agent or the like). A value of the secondary particle size of the cohesive silica divided by the thickness of the hard coat layer containing the secondary particle is preferably 0.1 to 2.0, and more preferably is 0.3 to 1.0.

The secondary particle size of a cohesive silica particle is measured with the Coulter counter method.

The content of the cohesive silica particle in the hard coat layer is preferably 0.1 to 50 mass %, and more preferably is 1 to 50 mass %, and most preferably is 1 to 30 mass %.

A translucent resin particle will be now described which is a translucent fine particle that can be used concomitantly with the above described cohesive metal-oxide particle, or preferably with a cohesive silica particle. The translucent resin particles are used for the purpose of [1] adjusting the surface haze and the inner haze, [2] increasing the surface hardness and [3] improving the brittleness and the curl of the hard coat layer while being contained therein.

A specific example of the translucent resin particle which can be concomitantly used preferably includes: a resin particle, such as a poly((meth)acrylate) particle, a cross-linked poly((meth)acrylate) particle, a polystyrene particle, a cross-linked polystyrene particle, a cross-linked poly(acrylic-styrene) particle, a melamine resin particle and a benzoguanamine resin particle. Among the particles, the cross-linked polystyrene particle, the cross-linked poly((meth)acrylate) particle, and the cross-linked poly(acrylic-styrene) particle are preferably used, and the cross-linked poly(meth)acrylate particle and the cross-linked poly(acrylic-styrene) particle are most preferably used. The inner haze can be controlled into a desired range by adjusting the refractive index of the translucent resin and an amount to be added, in accordance with the refractive index of each type of translucent fine particles selected from these particles. The average particle size of the translucent resin particle which can be concomitantly used is preferably 0.5 to 10 μm, and more preferably is 1 to 8 μm.

The average particle size of the translucent resin particles which can be concomitantly used is measured with the Coulter counter method.

The content of the translucent resin particle in the hard coat layer is preferably 0.1 to 50 mass %, more preferably is 1 to 50 mass %, and further preferably is 1 to 30 mass %.

[Application]

The hard coat layer of the film according to the present invention can be formed with the following application method, but the method is not limited to the following application method.

Usable known methods include, for instance, a dip coating method, an air-knife coating method, a curtain coating method, a roller coating method, a wire-bar coating method, a gravure coating method, an extrusion coating method (die coating method) (refer to U.S. Pat. No. 2,681,294) and a micro-gravure coating method, and among the methods, the micro-gravure coating method and the die coating method are preferable.

A micro-gravure coating method to be used in the present invention is a coating method of: arranging a gravure roll which has a diameter of approximately 10 to 100 mm and preferably of approximately 20 to 50 mm, and has a gravure pattern engraved on the whole circumference, in the lower part of a support; rotating the gravure roll backward with respect to a direction of transporting the support and simultaneously scraping off a surplus application liquid from the surface of the gravure roll with a doctor blade; and transferring a fixed quantity of the application liquid to the lower surface of the support existing on the position at which the upper surface of the support is in a free state, and coating the application liquid on the lower surface. The hard coat layer can be coated on one side of the wound-off support which has been continuously wound off from the transparent support in a rolled form, with the micro-gravure coating method.

As for the coating conditions in a micro-gravure coating method, the number of lines of the gravure pattern engraved on the gravure roll is preferably 50 to 800 lines/inch, and more preferably is 100 to 300 lines/inch; the depth of the gravure pattern is preferably 1 to 600 μm, and more preferably is 5 to 200 μm; the number of rotations of the gravure roll is preferably 3 to 800 rpm, and more preferably is 5 to 200 rpm; and the transportation speed of the support is preferably 0.5 to 100 m/min, and more preferably is 1 to 50 m/min.

In order to supply an optical film according to the present invention with great productivity, an extrusion method (die coating method) is preferably used. The extrusion method can be preferably used in the hard coat layer particularly of which the amount of the wet application liquid is in a region of being small (20 ml/m$^2$ or less).

[Drying]

The film according to the present invention is preferably transported in the form of the web to a heated zone so that the solvent is dried, after the application liquid has been applied directly onto the support.

Various kinds of information can be used for a method of drying the solvent. The specific information includes Japanese Patent Application Laid-Open No. 2001-286817, Japanese Patent Application Laid-Open No. 2001-314798, Japanese Patent Application Laid-Open No. 2003-126768, Japanese Patent Application Laid-Open No. 2003-315505 and Japanese Patent Application Laid-Open No. 2004-34002. The temperature in a drying zone is preferably set at 25° C. to 140° C., the temperature in the first half of the drying zone is preferably set relatively low, and the temperature in the latter half of the drying zone is preferably set relatively high. However, the temperatures are preferably not higher than a temperature at which components contained in an application composition of each layer except the solvent start volatilization. For instance, in commercially-available radical-photo-generating agents which are concomitantly used with an ultraviolet curing resin, there is one in which about several tens of percentages of the composition volatilize within several minutes in the warm air at 120° C., and in monofunctional or bifunctional acrylate monomers, there is one in which the volatilization progresses in the warm air at 100° C. In such a case, as described above, the temperature in the drying zone is preferably not higher than the temperature at which components contained in an application composition of each layer except the solvent start volatilization.

In addition, as for the drying wind to be supplied after the application composition of each layer has been applied onto the support, the wind speed on the surface of the coating film is preferably in the range of 0.1 to 2 m/sec while the solid concentration of the application composition is 1 to 50%, in order to prevent the unevenness of drying.

Furthermore, after the application composition of each layer has been applied onto the support, a difference between temperatures of the transportation roll which comes in contact with the reverse face of the liquid-applied face of the support in the drying zone and the support is preferably set in the range of 0° C. to 20° C., because the unevenness of drying due to the unevenness of heat transfer on the transportation roll can be prevented.

[Curing]

After the solvent has been dried, the optical film according to the present invention is passed in the form of the web through the zone in which each coating film is cured by ionizing radiation and/or heat, and the coating film is cured there. The type of ionizing radiation in the present invention is not particularly limited, but can be appropriately selected from ultraviolet light, an electron beam, near-ultraviolet light, visible light, near-infrared light, infrared light, X-rays and the like, according to the type of the curable composition which forms the film. Among the types of ionizing radiation, the ultraviolet light and the electron beam are preferable, and the ultraviolet light is particularly preferable at the point that handling is easy and high energy can be easily obtained.

Any light source can be used as a light source of the ultraviolet light for photopolymerizing an ultraviolet reactive compound as long as the light source generates the ultraviolet light. For instance, usable light sources include a low-pressure mercury lamp, a medium-pressure mercury lamp, a high-pressure mercury lamp, an ultrahigh-pressure mercury lamp, a carbon-arc lamp, a metal halide lamp and a xenon lamp. The usable light sources include also an ArF excimer laser, a KrF excimer laser, an excimer lamp and synchrotron radiation. Among the light sources, preferably usable light sources are the ultrahigh-pressure mercury lamp, the high-pressure mercury lamp, the low-pressure mercury lamp, the carbon arc lamp, the xenon arc lamp and the metal halide lamp.

Similarly, the electron beam can also be used. The electron beam can include an electron beam which is emitted from a wide variety of electron beam accelerators such as a cockcroft-walton type, a Van de Graaff type, a resonance transformation type, an insulation core transformer type, a linear type, a dynamitron type and a high-frequency type, and has an energy of 50 to 1,000 keV and preferably of 100 to 300 keV.

The irradiation condition varies depending on each lamp, but the amount of light irradiation is preferably 10 $mJ/cm^2$ or more, further preferably is 50 $mJ/cm^2$ to 10,000 $mJ/cm^2$, and particularly preferably is 50 $mJ/cm^2$ to 2,000 $mJ/cm^2$. At this time, a distribution of the amount of irradiation in the width direction of the web is preferably 50 to 100% with respect to the maximum amount of irradiation in the center when including the both ends, and more preferably is 80 to 100%.

In the present invention, it is preferable to cure the hard coat layer on the support by a process of irradiating the layers with the ionizing radiation, and irradiating the layers with the ionizing radiation in a state of having heated the layers so that the surface temperature of the film becomes 50° C. or higher in an atmosphere containing oxygen with a concentration of 1,000 ppm or less, preferably of 500 ppm or less, further preferably of 100 ppm or less and most preferably of 50 ppm or less, for 0.5 seconds or longer from the time of having started irradiation with the ionizing radiation.

It is also preferable to heat the layers in an atmosphere containing a low concentration of oxygen simultaneously and/or sequentially with irradiation with the ionizing radiation.

A period of time for irradiating the layers with the ionizing radiation is preferably 0.7 seconds or longer and 60 seconds or shorter, and more preferably is 0.7 seconds or longer and 10 seconds or shorter. When the period of time is 0.5 seconds or shorter, a curing reaction cannot be completed and the layers cannot be sufficiently cured. On the other hand, it is not preferable to keep the condition of the low oxygen concentration for a long period of time, because a large facility and a large amount of an inactive gas are needed.

As for the technique of controlling the oxygen concentration to 1,000 ppm or less, it is preferable to replace the atmosphere with another gas, and particularly preferable to replace the atmosphere with nitrogen (nitrogen purge).

By supplying an inactive gas to a chamber for irradiation with the ionizing radiation (also referred to as "reaction chamber"), in which the curing reaction is proceeded by the ionizing radiation, and setting the condition so that the inactive gas blows out toward the entrance side of the web in the reaction chamber, it is possible to eliminate the air carried together with a transported web, effectively lower the oxygen concentration in the reaction chamber and efficiently decrease the substantial oxygen concentration on the extreme surface in which curing is greatly obstructed by oxygen. The flow direction of the inactive gas in the entrance side of the web in the reaction chamber can be controlled by adjusting the balance between gas supply and exhaust in the reaction chamber.

It is also preferably used as a method of eliminating the carried air to spray an inactive gas directly onto the surface of the web.

It can also more efficiently proceed curing to provide a front chamber in front of the above described reaction chamber and eliminate oxygen on the surface of the web in advance. In addition, it is preferable to set the gap between a side face constituting the entrance side of the web in the ionizing radiation reaction chamber or the front chamber and the surface of the web preferably at 0.2 to 15 mm, more preferably at 0.2 to 10 mm, and most preferably at 0.2 to 5 mm, so as to efficiently use the inactive gas.

[Production of Polarizing Plate]

When the optical film according to the present invention is used in a liquid-crystal display device, the optical film is arranged on the outermost surface of the display by providing an adhesive layer on one side or by another method. Because triacetyl cellulose is used as a protective film for protecting the polarizing layer (polarizer) of a polarizing plate, when the transparent support is made from triacetyl cellulose, it is preferable to use the optical film according to the present invention for the protective film directly, from the view point of the cost.

When the optical film of the present invention is arranged on the outermost surface of the display by providing the adhesive layer on the one side or by another method, or is used directly as the protective film for the polarizing plate, it is preferable to form the outermost layer which contains a fluorine-containing polymer as a main component on the transparent support and then subject the transparent support to a saponification treatment, in order to make the optical film sufficiently adhere to the display or the polarizing plate. The saponification treatment can be carried out by a known technique, for instance, of dipping the optical film in an alkaline liquid for an appropriate period of time. After having been dipped in the alkaline liquid, the film is preferably fully washed with water, or is dipped in a diluted acid so that the alkaline component is neutralized, in order that the alkaline component does not remain in the film.

By being subjected to the saponification treatment, the surface of the transparent support opposite to the side having the outermost layer is hydrophilized.

The hydrophilized surface is especially effective for improving its adhesiveness to a polarizing film which contains polyvinyl alcohol as a main component. In addition, it is difficult for dust in the air to deposit onto the hydrophilized surface, and accordingly it is difficult for the dust to enter between the polarizing film and the optical film when the surface is bonded to the polarizing film, which is effective for preventing a point defect due to dust.

It is preferable to carry out the saponification treatment so that the contact angle of the surface of the transparent support on the opposite side to the side which has the outermost layer with water becomes 40° or less. The contact angle is more preferably is 30° or less, and most preferably is 20° or less.

The specific device of the alkali saponification treatment can be selected from the following two devices (1) and (2). The device (1) is excellent in the point that the film can be treated in the same process as that for a general-purpose triacetyl cellulose film, but even an antireflection-coating face is subjected to the saponification treatment. Accordingly, such points can become problems that the film deteriorates due to the alkaline hydrolysis of the surface and when the saponification treatment liquid remains, the remainder makes dirt. In that case, the device (2) is excellent though the process becomes special.

(1) The device of saponifying the back surface of the film by forming an antireflection layer on the transparent support, and dipping the resultant transparent support into an alkaline liquid at least once.

(2) The device of saponifying only the back surface of the optical film by applying an alkaline liquid onto the face on the opposite side to the face on which the antireflection layer of the optical film is formed, heating the optical film, and washing and/or neutralizing the alkaline liquid, before or after the antireflection layer is formed on the transparent support.

The antireflection film of the present invention is preferably used as at least one film of two sheets of protective films, which sandwich the polarizing film from both sides. The manufacturing cost of the polarizing plate can be reduced in which the optical film according to the present invention serves as the protective film. In addition, the polarizing plate which prevents outdoor light from being reflected and also has an excellent scratch resistance, antifouling properties and the like can be provided by using the optical film according to the present invention for the outermost layer.

A polarizing film allowed to be used includes a known polarizing film and a polarizing film cut out from a long polarizing film, in which an absorption axis of the polarizing film is neither parallel nor perpendicular to a longitudinal direction. The long polarizing film in which an absorption axis of the polarizing film is neither parallel nor perpendicular to the longitudinal direction is produced with the following method.

Specifically, the long polarizing film is a polarizing film which is manufactured by stretching a polymer film continuously supplied by imparting a tension thereto while holding both ends of the polymer film with holding devices and can be manufactured by a stretching method of stretching the polymer film so that a length at least in the direction of the film width is stretched by 1.1 to 20.0 times, a difference of a travelling speed in a longitudinal direction between the devices which hold the both ends of the film is 3% or less, and the travelling direction of the film is inflected so that an angle formed by the travelling direction of the film and the substantial direction of stretching the film at the outlet of a process of holding the both ends of the film is inclined by 20 to 70°, in the state of holding the both ends of the film. The polarizing film which has been inclined particularly by 45° is preferably used from a viewpoint of the productivity.

The method for stretching the polymer film is described in detail in paragraphs 0020 to 0030 of Japanese Patent Application Laid-Open No. 2002-86554.

When the optical film according to the present invention is used for one side of the surface protection film of the polarizing film, the optical film can be preferably used for a liquid-crystal display device of a transmission type, a reflection type or a semi-transmission type of mode such as a twisted nematic (TN) cell, a super twisted nematic (STN) cell, a vertical alignment (VA) cell, an in-plane switching (IPS) cell and an optically compensated bend (OCB) cell.

The liquid crystal cell of a VA mode includes; (1) a liquid crystal cell of the VA mode in the narrow sense, which orientates rod-like mesomorphic molecules substantially vertically when voltage is not applied, and orientates the molecules substantially horizontally when the voltage is applied (described in Japanese Patent Application Laid-Open No. 2-176625); (2) a liquid crystal cell in which the VA mode is modified to be multi-domain mode (MVA mode) for widening a view angle (described in SID97, Digest of tech. Papers (proceedings) 28 (1997) 845); (3) a liquid crystal cell of a mode (n-ASM mode) which orientates the rod-like mesomorphic molecules substantially vertically when voltage is not applied, and orientates the molecules in a twisted multi-domain mode when the voltage is applied (described in proceedings of the symposium of Japanese Liquid Crystal Society 58 to 59 (1998)); and (4) the liquid crystal cell of a SURVAIVAL mode (presented in LCD international 98).

A polarizing plate which is produced by combining the biaxially stretched triacetyl cellulose film with an optical film according to the present invention is preferably used for the liquid crystal cell of the VA mode. A method for producing the biaxially stretched triacetyl cellulose film preferably employs methods described, for instance, in Japanese Patent Application Laid-Open No. 2001-249223, Japanese Patent Application Laid-Open No. 2003-170492 and the like.

A liquid crystal cell of an OCB mode is a liquid-crystal display device using a liquid crystal cell of a bend orientation mode which orientates rod-like mesomorphic molecules in the upper part of the liquid crystal cell substantially in the reverse direction (symmetrically) to those in the lower part, and is disclosed in each specification of U.S. Pat. No. 4,583,825 and U.S. Pat. No. 5,410,422. Because the rod-like mesomorphic molecules in the upper part and the lower part of the liquid crystal cell are symmetrically orientated, the liquid crystal cell in the bend orientation mode has an optically self-compensatory function. For this reason, this liquid crystal mode is referred to as OCB (Optically Compensatory Bend) liquid crystal mode as well. The liquid-crystal display device of the bend orientation mode has an advantage of having a quick response speed.

A liquid crystal cell of an ECB mode has the rod-like mesomorphic molecules orientated substantially horizontally when the voltage is not applied, is used mostly as a color TFT liquid-crystal display device, and is described in a number of literatures. The liquid crystal cell of the ECB model is described, for instance, in "EL, PDP, LCD display", published by Toray Research Center, Inc. (2001).

It is preferable particularly for a liquid-crystal display device of a TN mode or an IPS mode to use an optical compensation film which has an effect of widening a view angle on the opposite side of the optical film of the present invention out of two protective films for both sides of a polarizing film, as is described in Japanese Patent Application Laid-Open No. 2001-100043 and the like, because the polarizing plate which can be thereby obtained has effects of preventing the reflection and of widening the view angle with the thickness of one polarizing plate.

EXAMPLE 1

A laminated film was formed by applying a hard coat layer with a thickness of 9 μm onto a TAC film with a thickness of 80 μm, drying the wet film, and curing the dried film by UV. The laminated film was transported by the tension shown in the Table, and samples were produced by exposing the face opposite to the hard-coat-applied surface to a vapor having an absolute humidity of 575 g/m$^3$ at a temperature of 110° C. for periods of time shown in the Table of FIG. 2. The samples were produced also by setting the tensions at the portions which were exposed to the vapor (vapor-treated portion) at values in the Table of FIG. 2.

Here, a curl value was measured. The curl value was measured according to the measuring method (ANSI/ASC PH 1.29-1985, Method-A) which is specified by American National Standards Institute. Specifically, the curl value in the width direction of the optical film was determined to be a curl value read out after the optical film was cut out into a size of 35 mm in the width direction and 2 mm in the longitudinal direction, then placed on a curl plate, and moisture-conditioned under an environment with a temperature of 25° C. and a relative humidity of 65% for 1 hour. Similarly, a curl value in the longitudinal direction was determined to be a curl value read out after the optical film was cut out into a size of 35 mm in the longitudinal direction and 2 mm in the width direction, then placed on a curl plate, and moisture-conditioned under an environment with a temperature of 25° C. and a relative humidity of 65% for 1 hour. The curl value is expressed by an inverse number of a curvature radius (m).

The sample was subjected to saponification treatment and lamination treatment, and the involvement of bubbles by and a position gap with the polarizing plate were evaluated.

The involvement of bubbles was evaluated to be "A" when the amount of involved bubbles was 0.01 pieces/m$^2$ or less, was evaluated to be "B" when the amount was more than 0.01 pieces/m$^2$ and 0.05 pieces/m$^2$ or less, was evaluated to be "C" when the amount was more than 0.05 pieces/m$^2$ and 0.1 pieces/m$^2$ or less, and was evaluated to be "D" when the amount was more than 0.1 pieces/m$^2$.

The position gap was evaluated to be "A" when the position gap of lamination was 0.5 mm or less, was evaluated to be "B", when the position gap was more than 0.5 mm and 1.5 mm or less, was evaluated to be "C" when the position gap was more than 1.5 mm and 3 mm or less, and was evaluated to be "D", when the position gap was more than 3 mm.

Figure 2:
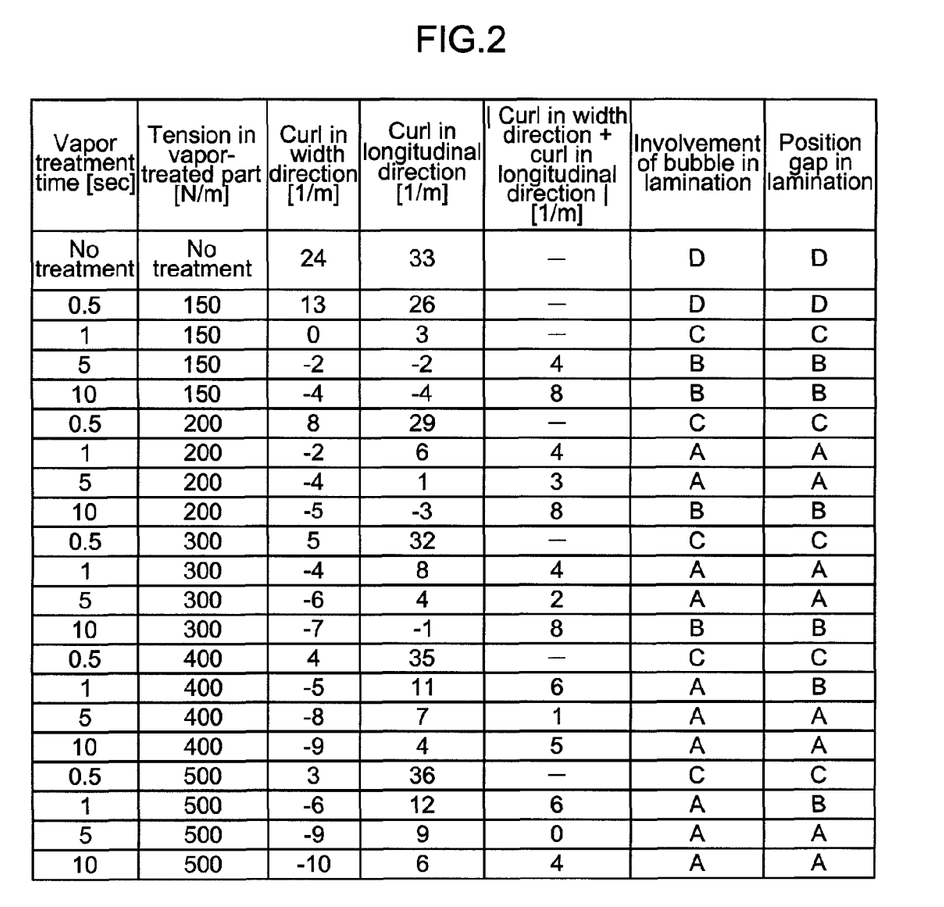
FIG. 2 is a view showing conditions and results of examples.

As is understood from the Table of FIG. 2, in samples which were laminated with optical films having a curl value of less than 0 [1/m] in the width direction and having a curl value of more than 0 [1/m] in the longitudinal direction, at least either of the involvement of bubbles or the position gap was evaluated to be "A". In addition, there was such a tendency that among the samples which satisfied those curl values, samples which satisfied that the absolute value of the sum of the curl values in the width direction and the longitudinal direction was 5 (1/m) or less showed better evaluation on the involvement of bubbles and the position gap.

Accordingly, it is understood that according to the present invention, there can be provided an optical film superior in transportability and lamination suitability in a lamination step in a polarizing plate processing, and a manufacturing method therefor.

What is claimed is:

1. An optical film which has a hard coat layer formed of an ionizing radiation curing type of a resin provided on one side of a plastic film substrate, comprising:

a curl value smaller than 0, which has been measured after the film substrate of a manufactured optical film has been cut out into a size of 35 mm in a width direction and 2 mm in a longitudinal direction and has been placed under an environment with a temperature of 25° C. and a relative humidity of 65% for 1 hour, when the curl value is defined to be plus when the surface which shall be defined to be the hard coat layer side curls inward and is defined to be minus when the surface curls outward;

and a curl value larger than 0, which has been measured after the film substrate has been cut out into a size of 2 mm in the width direction and 35 mm in the longitudinal direction and has been placed under an environment with a temperature of 25° C. and a relative humidity of 65% for 1 hour, wherein the curl value has been measured according to ANSI/ASC PH1.29-1985 Method-A.

2. The optical film according to claim 1, wherein an absolute value of the sum of the curls of the optical films is 5 (1/m) or less, one of which has been cut out into a size of 35 mm in the width direction and 2 mm in the longitudinal direction and the other of which has been cut out into a size of 2 mm in the width direction and 35 mm in the longitudinal direction.

3. A polarizing plate using the optical film according to claim 1, as a protective layer.

4. A polarizing plate using the optical film according to claim 2, as a protective layer.

* * * * *